United States Patent
Wen et al.

(10) Patent No.: US 12,039,748 B2
(45) Date of Patent: Jul. 16, 2024

(54) BUBBLE MEASUREMENT SYSTEM AND METHOD

(71) Applicants: TE Connectivity Services GmbH, Schaffhausen (CH); Tyco Electronics (Shanghai) Co., Ltd., Shanghai (CN)

(72) Inventors: Du Wen, Reading, PA (US); Roberto Francisco-Yi Lu, Bellevue, WA (US); Shu Wang, Middletwown, PA (US); Lei Zhou, Shanghai (CN); Michael Ritchie, Hampton, VA (US); Michael Pedrick, Hampton, VA (US); Philip Amante, Hampton, VA (US); Sonny O. Osunkwo, Harrisburg, PA (US)

(73) Assignees: Tyco Electronics (Shanghai) Co., Ltd. (CN); TE Connectivity Solutions GmbH (CH)

( * ) Notice: Subject to any disclaimer, the term of this patent is extended or adjusted under 35 U.S.C. 154(b) by 163 days.

(21) Appl. No.: 17/558,639

(22) Filed: Dec. 22, 2021

(65) Prior Publication Data
US 2023/0077112 A1    Mar. 9, 2023

(51) Int. Cl.
*G06T 7/62* (2017.01)
*G01B 11/10* (2006.01)
*G01F 22/00* (2006.01)
*G01N 21/85* (2006.01)
*H04N 23/56* (2023.01)
*H04N 23/74* (2023.01)

(52) U.S. Cl.
CPC ............... *G06T 7/62* (2017.01); *G01B 11/10* (2013.01); *G01F 22/00* (2013.01); *G01N 21/85* (2013.01); *H04N 23/56* (2023.01); *H04N 23/74* (2023.01); *G01N 2201/061* (2013.01); *G01N 2201/0696* (2013.01)

(58) Field of Classification Search
CPC .......... G06T 7/62; G01B 11/10; G01F 22/00; G01N 21/85; G01N 2201/061; G01N 2201/0696; H04N 23/56; H04N 23/74
See application file for complete search history.

(56) References Cited

U.S. PATENT DOCUMENTS

| | | | | |
|---|---|---|---|---|
| 2004/0253183 A1* | 12/2004 | Uber, III | ............... | A61M 5/007 604/23 |
| 2007/0294875 A1* | 12/2007 | Hachiya | ............. | H05K 13/0812 29/428 |
| 2013/0116703 A1* | 5/2013 | Kosar | ................ | A61B 17/2251 606/128 |
| 2017/0011506 A1* | 1/2017 | Bojovschi | ............. | G01N 13/02 |
| 2017/0135169 A1* | 5/2017 | Panek | ................ | H05B 45/397 |

(Continued)

FOREIGN PATENT DOCUMENTS

JP    3834611 B2  *  10/2006

*Primary Examiner* — Nasim N Nirjhar

(57) ABSTRACT

A bubble measurement system includes a bubble detector including a vessel having a flow path configured to receive a flow of fluid includes air bubbles from a bubble generator. The bubble measurement system includes an imaging system having an imaging device for imaging the fluid and air bubbles in the flow path of the vessel of the bubble detector. The imaging system has an imaging controller coupled to the imaging device and receiving images from the imaging device. The imaging controller processes the images to measure bubble size of each air bubble passing through the bubble detector.

23 Claims, 3 Drawing Sheets

(56) References Cited

U.S. PATENT DOCUMENTS

2019/0159786 A1* 5/2019 Balfour ................. B01F 23/235
2021/0353968 A1* 11/2021 Cancelos ........... G01N 29/2437
2022/0228894 A1* 7/2022 Ishizaki ................. G01F 1/662

* cited by examiner

BUBBLE MEASUREMENT SYSTEM AND METHOD

CROSS REFERENCE TO RELATED APPLICATIONS

This application claims benefit to Chinese Application No. 202111055057.8, filed 9 Sep. 2021, the subject matter of which is herein incorporated by reference in its entirety.

BACKGROUND OF THE INVENTION

The subject matter herein relates generally to methods and apparatus for bubble sizing.

Reliable detection of air bubbles in liquid is critical for many applications, such as medical dosing applications. Known air bubble detection sensors attach to vessels, such as IV tubes, to detect air bubbles in the vessel. Detection of bubble size is an important specification of the sensors. The sensors are calibrated using a testing system that includes a bubble generator, which generates air bubbles of known size and quantity in water or other transparent or semi-transparent fluid. The air bubbles from the bubble generator flow through the sensor for testing. A bubble generator capable of repeatably generating consistent bubbles at various flow rates is necessary to validate the testing of the sensor. However, calibration of the bubble generator to ensure that the bubble generator is accurately generating bubbles of a desired size is difficult.

Known calibration systems for the bubble generator are inaccurate, labor intensive, and time consuming. For example, known calibration systems for bubble generators use an aggregated collection of many air bubbles in a graduated cylinder to determine an average size of the air bubbles (total volume of air bubbles collected divided by total number of air bubbles collected). Such method only yields average size of the air bubbles. Actual sizes of each air bubble cannot be validated using such technique. Such systems are unable to test various, controlled sizes of air bubbles and/or air bubbles moving at different velocities and/or air bubbles released at different rates.

A need remains for a robust bubble size measurement system for calibrating a bubble generator.

BRIEF DESCRIPTION OF THE INVENTION

In one embodiment, a bubble measurement system is provided and includes a bubble detector including a vessel having a flow path configured to receive a flow of fluid includes air bubbles from a bubble generator. The bubble measurement system includes an imaging system having an imaging device for imaging the fluid and air bubbles in the flow path of the vessel of the bubble detector. The imaging system has an imaging controller coupled to the imaging device and receiving images from the imaging device. The imaging controller processes the images to measure bubble size of each air bubble passing through the bubble detector.

In another embodiment, a bubble measurement system is provided and includes a bubble generator having an air bubble injector coupled to a fluid supply. The bubble generator controls fluid pressure of the fluid supply. The bubble generator controls fluid flow rate of the fluid supply. The bubble generator controls air bubble size. The bubble generator controls air bubble release rate. The bubble measurement system includes a bubble detector including a vessel having a flow path receiving the fluid from the fluid supply includes the air bubbles from the bubble generator. The bubble measurement system includes an imaging system having an imaging device for imaging the fluid and the air bubbles in the flow path of the vessel of the bubble detector. The imaging system has an imaging controller coupled to the imaging device and receiving images from the imaging device. The imaging controller processes the images to measure bubble size of each air bubble passing through the bubble detector. The imaging controller generates a control signal. The control signal used to control operation of the bubble generator based on the bubble size measured by the imaging system.

In a further embodiment, a method of controlling a bubble generator used to introduce air bubbles into a fluid flow is provided. The method passes the fluid includes the air bubbles through a vessel of a bubble detector. The method images the fluid and the air bubbles passing through the bubble detector using an imaging device. The method processes the images of the air bubbles to determine bubble sizes of the air bubbles. The method controls the bubble generator based on the bubble sizes determined based on the images of the air bubbles.

DETAILED DESCRIPTION OF THE INVENTION

Figure 1:
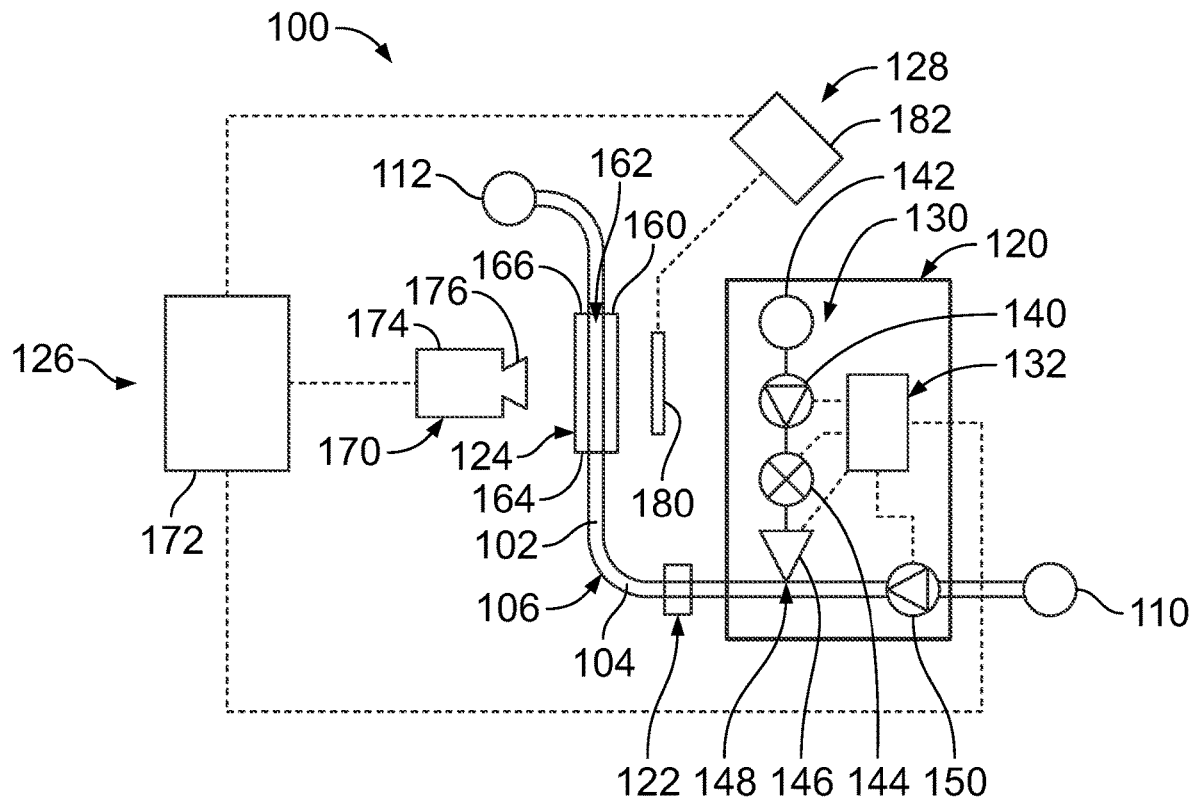
FIG. 1 illustrates a bubble measurement system in accordance with an exemplary embodiment.

FIG. 1 illustrates a bubble measurement system 100 in accordance with an exemplary embodiment. The bubble measurement system 100 is used to measure characteristics of air bubbles 102 in fluid 104 flowing through a channel 106. The fluid 104 may be water or other transparent or semi-transparent fluid. The channel 106 may be formed by a vessel or a hose. The channel 106 extends between a fluid supply reservoir 110 and a fluid discharge reservoir 112. A bubble generator 120 is used to introduce the air bubbles 102 into the fluid 104. In an exemplary embodiment, the bubble measurement system 100 is used to calibrate the bubble generator 120.

In an exemplary embodiment, the calibrated bubble generator 120 is used for testing a bubble detection sensor 122. The bubble detection sensor 122 may be an ultrasonic sensor, such as the AD-101 sensor, commercially available from TE Connectivity. The bubble measurement system 100 calibrates the bubble generator 120 for accurate testing of the bubble detection sensor 122. The bubble detection sensor 122 may be tested at the same workstation operating the bubble measurement system 100. Alternatively, the bubble measurement system 100 may be used to calibrate the bubble generator 120 and the calibrated bubble generator 120 may be removed from the bubble measurement system 100 and used a separate testing workstation to test the bubble detection sensor 122.

In an exemplary embodiment, the bubble measurement system 100 includes a bubble detector 124, and imaging system 126 associated with the bubble detector 124, and a lighting system 128 associated with the bubble detector 124 and the imaging system 126. The air bubbles 102 and the fluid 104 flows through the bubble detector 124. The imaging system 126 images the air bubbles 102 in the fluid 104 and analyzes the images to measure characteristics of the air bubbles 102. The lighting system 128 enhances the images by providing appropriate lighting to image the air bubbles 102 in the fluid 104. In an exemplary embodiment, the imaging system 126 provides a feedback loop to the bubble generator 120 to control operation of the bubble generator 120, such as for proper calibration of the bubble generator 120. The bubble measurement system 100 may be configured to generate an error correction for the bubble generator 120 being tested. For example, the bubble measurement system 100 may use the known bubble size from the bubble generator 120 and the output from the bubble detector 124 to generate error correction curves that may be input into the bubble generator 120 to calibrate the bubble generator 120. Thus, the bubble detector 124 may be used to calibrate the bubble generator 120. The bubble generator 120 of the bubble measurement system 100 may be configured to generate bubbles of known bubble size. The output of the bubble detector being tested may be used to create error correction curves for the particular device under test. As such, the device may be calibrated to give the bubble detector 124 the capability to measure bubbles with high accuracy and resolution.

The bubble generator 120 includes an air bubble injector 130 and a bubble generator controller 132 operably coupled to the air bubble injector 130. The air bubble injector 130 is used to form the air bubbles 102 and inject the air bubbles 102 into the fluid 104 flowing through the channel 106. In an exemplary embodiment, the bubble generator controller 132 is operably coupled to one or more of the components of the air bubble injector 130 to control operation of the air bubble injector 130, such as to control the size of the air bubbles 102.

In an exemplary embodiment, the air bubble injector 130 includes an air pump 140 used to pressurize air from an air source 142, such as a canister or the external environment. The air bubble injector 130 includes a valve 144 used to control airflow through the air bubble injector 130. The air bubble injector 130 includes a nozzle 146 used to supply air to the channel 106. The nozzle 146 includes an opening 148 communicatively coupled to the channel 106. The air is supplied to the channel 106 through the opening 148. In an exemplary embodiment, the size of the opening 148 may be variable and selectively controlled to control the amount of airflow into the channel 106. For example, the bubble generator controller 132 may be operably coupled to the nozzle 146 to control a position of the nozzle 146 to adjust airflow through the opening 148. The nozzle 146 controls the size of the air bubble 102 by controlling the size of the opening 148. In various embodiments, the nozzle 146 may be rotated to change the size of the opening 148. In an exemplary embodiment, the valve 144 may be opened and closed to control the airflow to the nozzle 146. The timing of opening and closing of the valve 144 is selectively controlled to control the amount of airflow to the nozzle 146. For example, the bubble generator controller 132 may be operably coupled to the valve 144 to control opening and closing of the valve 144. In an exemplary embodiment, the pressure of the airflow through the air bubble injector 130 may be controlled by the air pump 140. For example, increasing or decreasing the pressure of the airflow may control the size of the air bubbles 102. The bubble generator controller 132 may be operably coupled to the air pump 140 to control operation of the pump 140, such as to increase or decrease the pressure of the airflow. The bubble measurement system 100 may be used to measure the size of the air bubbles 102 by imaging the air bubbles 102 passing through the bubble detector 124. For example, the bubble measurement system 100 may measure the diameter of the air bubble 102 to determine the air bubble size. The bubble measurement system 100 may calculate a volume of the air bubble 102 based on the diameter of the air bubble 102 in the image. The bubble generator controller 132 may receive feedback or control signals from the bubble measurement system 100 to control one or more operating parameters of the bubble generator 120, such as to control the air pump 140 and/or the valve 144 and/or the nozzle 146.

In an exemplary embodiment, the bubble generator 120 includes a fluid pump 150 to control flow of the fluid 104 through the channel 106. The pressure of the fluid 104 in the channel 106 may be controlled by the fluid pump 150. The flow rate of the fluid 104 in the channel 106 may be controlled by the fluid pump 150. In an exemplary embodiment, the bubble generator controller 132 is operably coupled to the fluid pump 150 to increase or decrease the pressure and/or the flow rate of the fluid 104 through channel 106. The bubble measurement system 100 may be used to measure the pressure and/or the flow rate of the fluid 104 through the channel 106 by imaging the air bubbles 102 passing through the bubble detector 124. For example, the bubble measurement system 100 may measure the rate of movement of the air bubble 102 through the bubble detector 124 to determine the flow rate. The bubble measurement system 100 may measure the shape of the air bubble 102 (for example, elongation of the air bubble) to determine the pressure. The bubble generator controller 132 may receive feedback or control signals from the bubble measurement system 100 to control one or more operating parameters of the bubble generator 120, such as to control the fluid pump 150.

The bubble detector 124 is located downstream of the bubble generator 120. The channel 106 passes through the bubble detector 124 to allow the fluid 104 and the air bubbles 102 to pass through the bubble detector 124. In an exemplary embodiment, the bubble detector 124 includes a vessel 160 having a flow path 162 configured to receive the fluid 104 and the air bubbles 102. For example, the flow path 162 may be defined by a bore through the vessel 160. The flow path 162 passes through the tube 160 between an inlet end 164 and an outlet end 166. In an exemplary embodiment, the vessel 160 is transparent. For example, the vessel 160 may be a glass tube or a plastic tube. The vessel 160 may be cylindrical in various embodiments. In such embodiments, the flow path 162 may be cylindrical. In other various embodiments, the vessel 160 may be rectangular. For example, the vessel may be formed by two parallel plates that are sealed at ends of the plates to form the flow path 162 between the two plates. The flow path 162 is narrow to flatten the air bubbles 102 as the air bubbles 102 pass through the flow path 162, which makes the air bubbles 102 a two dimensional space that can easily be detected and measured. For example, knowing the width and depth of the flow path 162 allows for accurate measurement of the air bubble 102 by measuring the height of the air bubble 102. The flow path 162 has a known cross-sectional area. For example, the flow path 162 has a known cross-sectional area (for example, width by depth or diameter), which is used by the bubble measurement system 100 to measure the size of the air bubbles 102. The flow path 162 may have the same cross-sectional area as the channel 106. Alternatively, the cross-sectional area of the flow path 162 may be different than the cross-sectional area of the channel 106. In various embodiments, the bubble detector 124 may include a sensor (not shown) for sensing the presence of one of the air bubbles 102, which may trigger operation of the imaging system 126 and/or the lighting system 128. Alternatively, operation of the imaging system 126 and/or the lighting system 128 may be triggered by the bubble generator 120, such as by release of the air bubble 102 from the bubble generator 120.

The imaging system 126 is used to image the air bubbles 102 passing through the bubble detector 124. The imaging system 126 includes an imaging device 170 and an imaging controller 172 coupled to the imaging device 170. The imaging device 170 takes digital images of the vessel 160 including the fluid 104 and the air bubbles 102, when present. The images may be still images or video images. In an exemplary embodiment, the imaging device 170 includes a camera 174 and a lens 176. The camera 174 may be a high speed, high resolution camera. In various embodiments, the camera 174 may capture multiple images per second. In an exemplary embodiment, the lens 176 is a telecentric lens. Other types of lenses may be used in alternative embodiments. In an exemplary embodiment, the imaging controller 172 receives the images from the imaging device 170 and processes the images. In an exemplary embodiment, the imaging controller 172 processes the images to measure characteristics of each air bubble 102 passing through the bubble detector 124. For example, the imaging controller 172 may measure the size of the air bubble 102. The imaging controller 172 may measure the flow rate of the fluid 104 and the air bubble 102 through the bubble detector 124. The imaging controller 172 may measure the pressure of the fluid 104 passing through the bubble detector 124. The imaging controller 172 may measure the number of air bubbles 102 passing through the bubble detector 124 during a calibration or testing cycle. In an exemplary embodiment, the imaging controller 172 may store the images and/or the results of the analysis. The imaging controller 172 may output the result of the analysis, such as to the bubble generator 120. For example, the imaging controller 172 may output the results of the analysis to the bubble generator controller 132, such as for comparison of the results with the control parameters for the bubble generator 120. If there are any errors or deviation between the results from the bubble measurement system 100 and the control parameters for the bubble generator 120, the bubble generator 120 may be updated and calibrated to equalize the measured results with the control parameters.

The lighting system 128 is used to supply appropriate lighting conditions for the imaging system 126. The lighting system 128 includes a backlight 180 used to light the fluid 104 and the air bubble 102 passing through the vessel 160. The backlight 180 is located on the opposite sides of the vessel 160 from the imaging device 170. In various embodiments, the vessel 160 may be oriented horizontally with the imaging device 170 position to one side of the vessel 160 and the backlight 180 positioned at the opposite sides of the vessel 160. Other orientations are possible in alternative embodiments, such as with the imaging device 170 positioned above the vessel 160 and the backlight 180 positioned below the vessel 160. In other embodiments, the vessel 160 may be non-horizontal, such as in a vertical orientation or at another angle.

In an exemplary embodiment, the lighting system 128 includes a strobe controller 182 operably coupled to the backlight 180. The strobe controller 182 is used to turn the backlight 180 on and off in a strobe effect, such as in short bursts. The timing of the lighting may be controlled during an image acquisition period of the imaging device 170, such as during the exposure time of the camera. The timing of the imaging and the strobe light are synchronized by the imaging controller 172 and the strobe controller 182. The strobe lighting has the effect of freezing motion of the fast-moving air bubbles 102 by creating strong and very short. Flashes so that good-quality images can be acquired.

During operation of the bubble measurement system 100 the bubble generator 120 may be calibrated. The bubble generator 120 operates and maintains predetermined settings, such as bubble size, bubble amount, bubble rate, pressure, flow rate, and the like. The imaging device 170 is triggered and starts to acquire images. The imaging device 170 may have a preset frame rate and exposure time to acquire the images. The frame rate and exposure time may be based on the bubble rate set by the bubble generator 120. The imaging controller 172 analyzes the images from the imaging device 170. The imaging controller 172 identifies the air bubbles 102 in the images. The imaging controller 172 measures characteristics of the air bubble 102, such as the bubble size, the bubble shape, the number of bubbles, the bubble flow rate, and the like. The imaging controller 172 provides measurements for each individual air bubble 102 generated by the bubble generator 120. The results of the measurements may be transmitted from the imaging controller 172 to the bubble generator controller 132 in a feedback loop for comparison and calibration of the bubble generator 120. Air signals may be generated by the bubble generator controller 132 when comparing the measured results to the setpoint parameters if any deviation difference is found. The bubble generator controller 132 may make any necessary corrections to the components of the bubble generator 120 to reduce any air and bring the output of the bubble generator 120 back to the setpoints. The bubble measurement system 100 is used for automatic calibration of the bubble generator 120. The bubble measurement system 100 may be used to control set up of the bubble generator 120. By measuring the individual air bubbles and providing feedback to the bubble generator 120 the bubble measurement system 100 improves repeatability, consistency, and accuracy of the bubble generator 120 for proper testing of the bubble detection sensor 122 (shown in FIG. 1). In various embodiments, the bubble measurement system 100 may include correction factors for proper analysis based on the type of fluid use, the viscosity of the fluid, the temperature of the fluid, the flow rate of the fluid, the pressure of the fluid, and the like.

Figure 2:
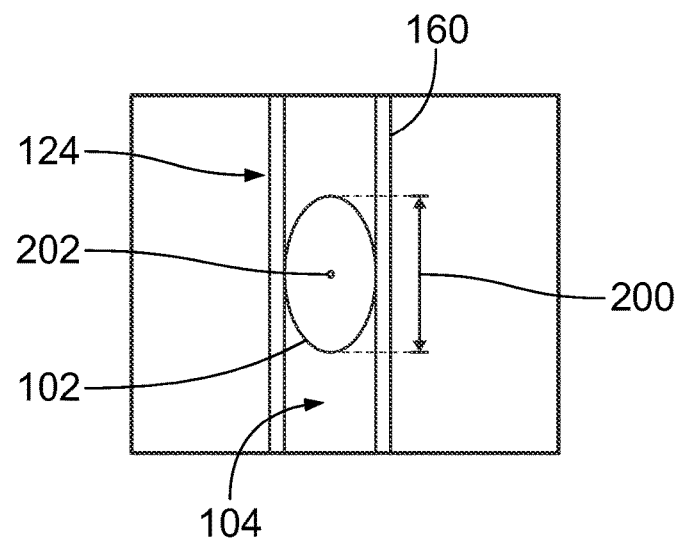
FIG. 2 illustrates an image acquired by the bubble measurement system in accordance with an exemplary embodiment.

FIG. 2 illustrates an image acquired by the bubble measurement system 100 in accordance with an exemplary embodiment. The imaging device focuses on the vessel 160 of the bubble detector 124. The fluid 104 and the air bubbles 102 are visible through the transparent vessel 160.

The imaging controller 172 analyzes the image to measure the size of the air bubble 102. In various embodiments, the imaging controller 172 may have a boundary recognition tool to identify the boundary of the air bubble 102 to measure the size and/or shape of the air bubble 102. In an exemplary embodiment, the imaging controller 172 determines a volume of the air bubble 102 by taking a measurement of a diameter 200 of the air bubble 102. The imaging controller 172 may determine a center 202 of the air bubble 102 and measure the diameter 200 across the center 202. For example, the diameter 200 may be measured by performing a best fit in finding a circle that best fits the boundary of the air bubble 102 which is centered at the center 202. In an exemplary embodiment, the imaging controller 172 calculates a volume of the air bubble 102 based on the measured diameter 200 of the air bubble 102. Other measurement techniques may be performed in alternative embodiments.

In various embodiments, the shape of the air bubble is determined using boundary recognition. The shape of the air bubble may be determined by comparing a width versus a height of the air bubble to determine roundness of the air bubble (for example to determine if the air bubble is circular or elongated, such as being oval). The shape of the air bubble may be determined to calculate flowrate and/or pressure of the fluid. For example, at higher flowrate or higher pressure, the air bubble 102 may be obround, such as being elongated in an oval-shape.

In various embodiments, the air bubble 102 may be detected at different locations along the vessel 160 within the field of view. For example, the same air bubble 102 may be imaged multiple times as the air bubble 102 flows through the vessel 160. The flow rate of the air bubble 102 may be determined by comparing relative positions of the air bubble 102 in different images.

Figure 3:
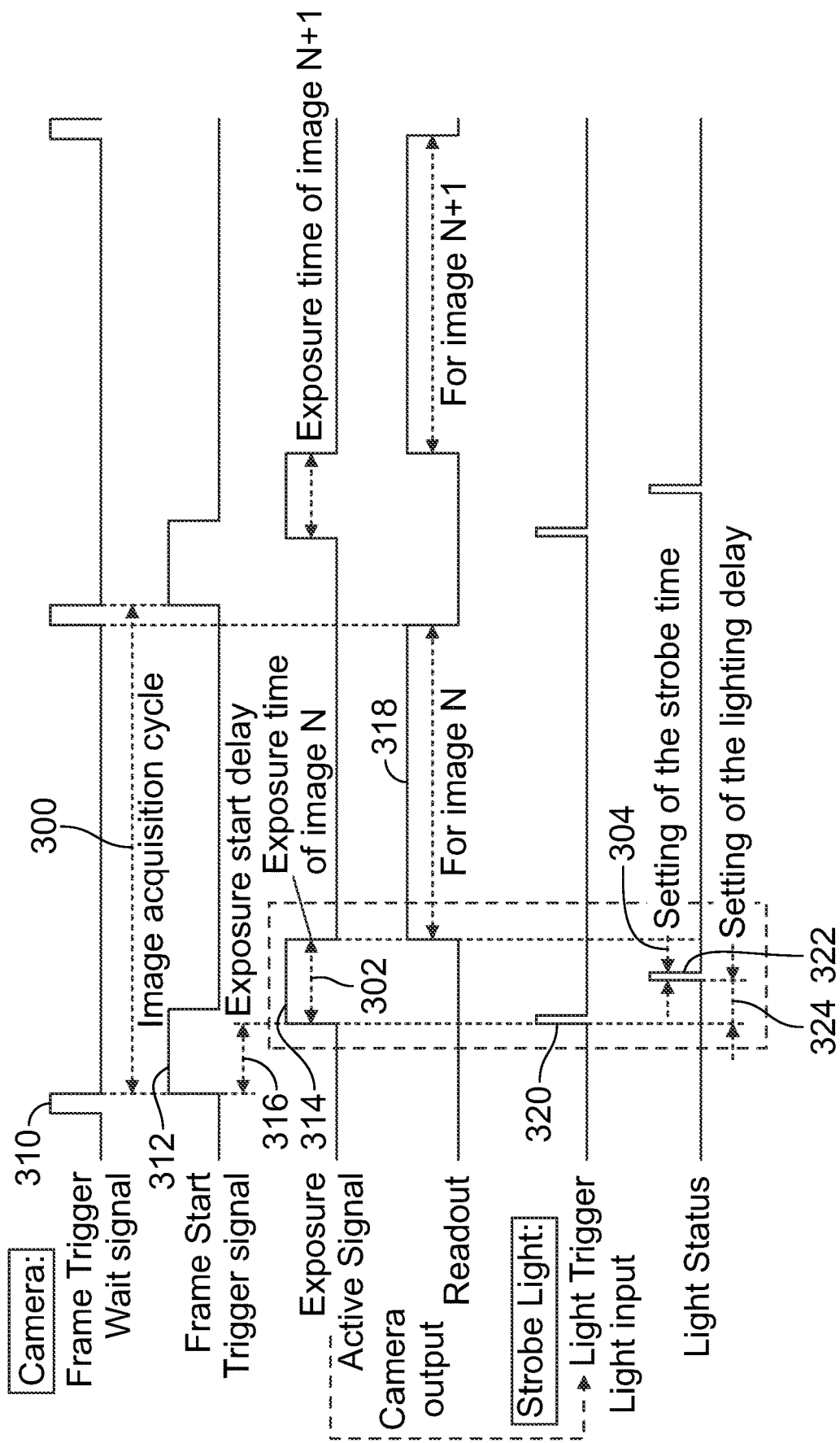
FIG. 3 is a chart showing synchronization of the imaging by the imaging system and the lighting by the lighting system in accordance with an exemplary embodiment.

FIG. 3 is a chart showing synchronization of the imaging by the imaging system 126 and the lighting by the lighting system 128 in accordance with an exemplary embodiment. The strobe effect of the lighting is synchronized with the image capture by the imaging device 170. The imaging device 170 has a predetermined frame rate 300 and exposure time 302, which may be set or adjusted by the imaging system 126. The backlight 180 is operated by the strobe controller 182 to turn on for a predetermined strobe time 304, which is shorter than the exposure time 302 and occurs during the exposure time 302. The strobe lighting effect is used as the camera shutter to freeze or capture the fast-moving air bubble and a brief moment during the exposure time during imaging. The strobe lighting effect eliminates image blur of the fast-moving air bubble.

The imaging system 126 generates a frame trigger wait signal 310 at the onset of each imaging period. The imaging system 126 generates a frame start trigger signal 312 immediately after the frame trigger wait signal 310. The imaging system 126 generates an exposure activation signal 314 after the frame start trigger signal 312 is generated. The exposure activation signal 314 is generated over the exposure time 302. Image acquisition occurs during the exposure activation signal 314. The exposure activation signal may occur at an exposure start delay period 316. After the exposure activation signal 314, the imaging system 126 performs a readout 318 and analyzes the image.

The imaging system 126 transmits a trigger signal 320 to the lighting system 128 when the exposure activation signal 314 is generated. The strobe controller 182 receives the trigger signal 320 and generates a lighting signal 322 to the backlight 180 to turn the backlight 180 on for the strobe time 304. The backlight 180 is turned on for a brief moment to create a flash of light during the image acquisition process. In an exemplary embodiment, the lighting signal 322 is generated after a lighting delay period 324. The lighting delay period 324 is shorter than the exposure time 302 to ensure that the lighting signal 322 is generated during the exposure time 302. The exposure time 302 and the lighting time may be measured in milliseconds and occur multiple times per second. As such, the imaging system 126 is able to capture images of each air bubble 102 as the air bubbles 102 pass through the bubble detector 124.

Figure 4:
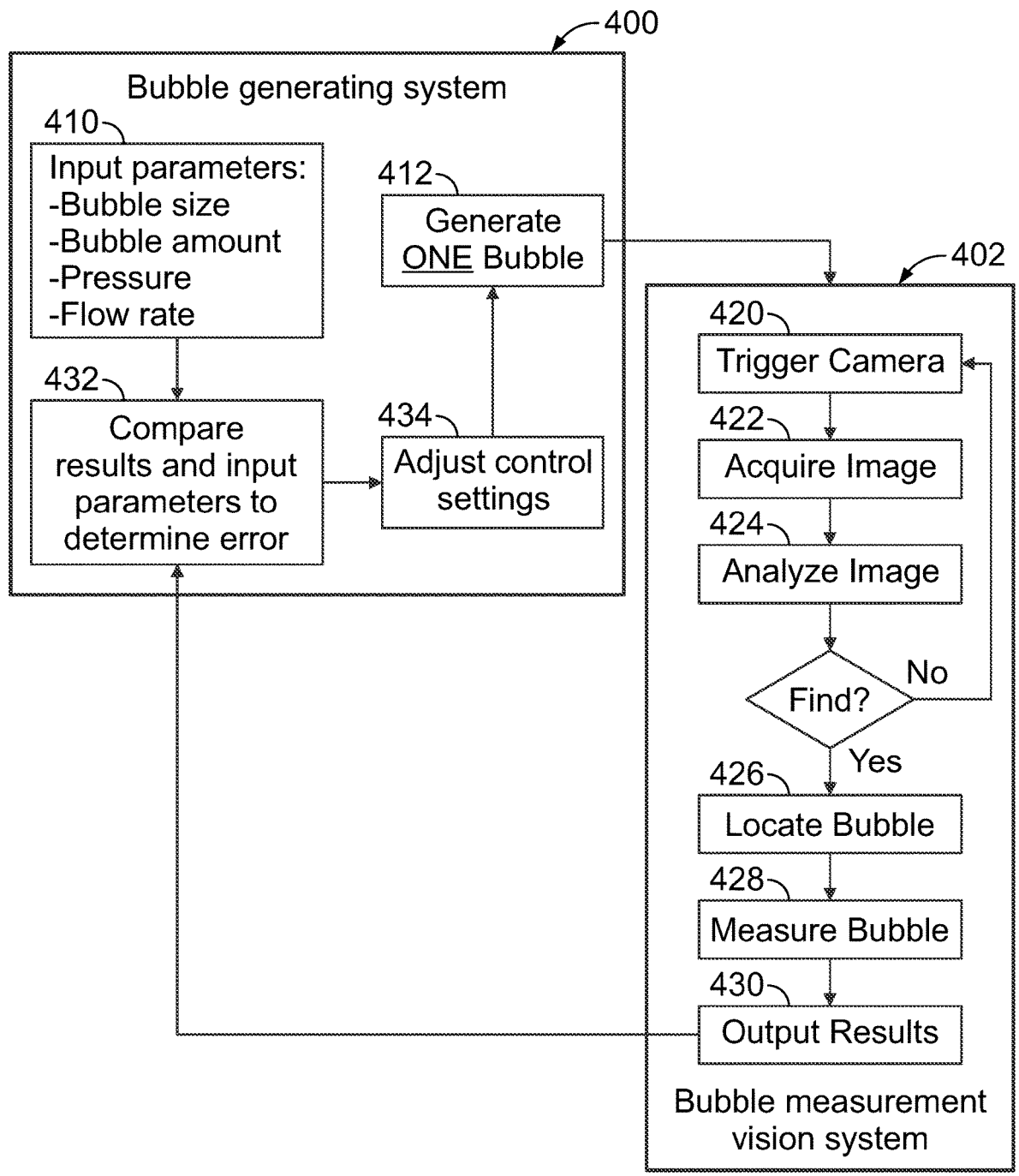
FIG. 4 is a flowchart showing operation of the bubble measurement system in accordance with an exemplary embodiment.

FIG. 4 is a flowchart showing operation of the bubble measurement system 100 in accordance with an exemplary embodiment. References made back to FIG. 2 for the various components of the bubble measurement system 100. The flowchart illustrates operations 400 of the bubble generator 120 and operations 402 of the imaging system 126.

The bubble generator 120 is set up by inputting 410 parameters for the bubble generator 120. The parameters may be input using knobs, dials, keypads, buttons, and the like to select the operating parameters for the bubble generator 120. The operating parameters may include a selection of bubble size, bubble amount, fluid pressure, fluid flow rate, and the like. The operating parameters are used to control operation of the components of the bubble generator 120, such as the air pump 140, the valve 144, the nozzle 146, the fluid pump 150, and the like.

At initial start up of the bubble generator 120, the bubble generator 120 is operated to generate 412 one air bubble at a time. The air bubbles may be released at predetermined release rates based on the input parameters to the bubble generator 120. During the calibration mode, the bubble generator 120 may be operated to release many air bubbles, which are individually measured and analyzed to calibrate the bubble generator 120; However, the air bubbles are individually generated by the bubble generator 120 and released at predetermined intervals.

At initial start up of the imaging system 126, at step 420, the camera is triggered. The camera may be triggered manually by starting the imaging system 126. The camera may be triggered automatically by a trigger signal from the bubble generator 120. At step 422, the camera acquires an image of the bubble detector 124. At step 424, the imaging controller 172 analyzes the image to identify and air bubble. If no air bubble is detected in the image, the process repeats and the cameras again triggered to acquire another image for analysis. If the air bubble is detected in the image, the imaging controller 172 locates 426 the air bubble and measures 428 the air bubble. The air bubble may be located by identifying a center of the air bubble and/or boundaries of the air bubble. The imaging controller 172 may measure one or more characteristics of the air bubble, such as the size of the air bubble, the shape of the air bubble, the location of the air bubble within the vessel 160, and the like. In various embodiments, the size of the air bubble is determined by measuring a diameter of the air bubble. The size of the air bubble may be determined by calculating a volume of the air bubble based on the diameter of the air bubble. In various embodiments, the shape of the air bubble is determined using boundary recognition. The shape of the air bubble may be determined by comparing a width versus a height of the air bubble to determine roundness of the air bubble (for example to determine if the air bubble is circular or elongated, such as being oval). The determined shape may be used in the calculation of the volume of the air bubble (for example, volume of sphere versus volume of ovoid). The imaging controller 172 may measure flowrate of the fluid by comparing relative locations of the air bubble in successive images.

At step 430, the imaging system 126 outputs the measurement results to the bubble generator 120. For example, the imaging system 126 may output the size measurements, the shape measurements, the flow rate measurements, the pressure measurements, and the like to the bubble generator 120. At step 432, the bubble generator 120 compares the measured results and the input parameters from the bubble generator 120 to determine errors or deviations between the measured results in the input parameters. For example, if the input parameter for the bubble size is a bubble size of M, but the measured bubble size is N, then the bubble generator 120 is ejecting the wrong size air bubbles and needs to be calibrated and adjusted by increasing the bubble size or decreasing the bubble size until the measured bubble size and the input parameter are equivalent.

At step 434, the bubble generator 120 adjusts control settings of one or more of the components of the bubble generator 120 to correct for the error. For example, the bubble generator controller 132 may adjust one or more operating parameters of the air pump 140 and/or the valve 144 and/or the nozzle 146 and/or the fluid pump 150. The bubble generator controller 132 may increase or decrease the air pressure supplied by the air pump 140, which may adjust the air bubble size. The bubble generator controller 132 may adjust the timing of the opening and closing of the valve 144 or may adjust how far the valve 144 is opened to adjust the amount of air released through the valve 144, which may adjust the air bubble size. The bubble generator controller 132 may adjust the nozzle 146 to change the size of the opening, which may adjust the air bubble size. The bubble generator controller 132 may adjust the speed of the fluid pump 152 increase or decrease the fluid pressure and/or flow rate. The bubble generator controller 132 automatically adjusts operating parameters of the components of the bubble generator 120 based on the feedback from the imaging system 126 to calibrate the bubble generator 120. The bubble generator 120 is calibrated based on actual measured bubble characteristics of each individual air bubble. The operating parameters of the components of the bubble generator 120 may be adjusted in real time during the calibration process, such as after each air bubble measurement or after a predetermined amount of the air bubble measurements.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A bubble measurement system comprising:
   a bubble detector including a vessel having a flow path configured to receive a flow of fluid including air bubbles from a bubble generator; and
   an imaging system having an imaging device for imaging the fluid and air bubbles in the flow path of the vessel of the bubble detector, the imaging system having an imaging controller coupled to the imaging device and receiving images from the imaging device, the imaging controller processing the images to measure bubble size of each air bubble passing through the bubble detector, wherein the imaging controller compares the measured bubble size to a setpoint bubble size of the bubble generator to determine a bubble size difference between the measured bubble size and the setpoint bubble size, wherein the imaging controller calibrates the bubble generator based on actual measured bubble characteristics of each individual air bubble.

2. The bubble measurement system of claim 1, wherein the imaging controller provides a feedback to the bubble generator to control the bubble generator.

3. The bubble measurement system of claim 1, wherein the imaging controller generates a control signal based on the bubble size difference for controlling the bubble generator.

4. The bubble measurement system of claim 1, wherein the imaging controller generates an error correction based on the bubble size difference for calibrating the bubble generator.

5. The bubble measurement system of claim 4, wherein the bubble generator generates bubbles having a known bubble size, an output from the bubble detector being used to generate error correction curves for calibration of the bubble generator.

6. The bubble measurement system of claim 1, wherein the imaging controller determines a diameter of the air bubble in the image and calculates a volume of the air bubble based on the diameter as a measurement of the bubble size of the air bubble.

7. The bubble measurement system of claim 1, further comprising a bubble generator having an air bubble injector coupled to a fluid supply, the bubble generator operating the air bubble injector to control an air bubble size of the air bubbles, wherein the imaging controller generates a control signal transmitted to the bubble generator to control operation of the air bubble injector based on the bubble size measured by the imaging system to adjust the air bubble size of the air bubbles released by the air bubble injector.

8. The bubble measurement system of claim 7, wherein the air bubble injector includes a nozzle having an opening, the control signal causing the bubble generator to adjust the nozzle and change a size of the opening to adjust the air bubble size.

9. The bubble measurement system of claim 7, wherein the air bubble injector includes a valve, the control signal controlling opening and closing of the valve to adjust an amount of air released by the air bubble injector to adjust the air bubble size.

10. The bubble measurement system of claim 1, further comprising a lighting system including a backlight used to light the fluid and the air bubble passing through the vessel, the lighting system including a strobe controller operably coupled to the backlight to turn the backlight on and off in a strobe effect.

11. The bubble measurement system of claim 10, wherein timing of operation of the backlight corresponds to timing of imaging by the imaging device.

12. The bubble measurement system of claim 10, wherein the backlight is turned on by the strobe controller for a strobing time, the strobing time being shorter than an exposure time of the imaging device.

13. The bubble measurement system of claim 10, wherein the imaging device transmits an activation signal to the strobe controller at an exposure start time, the strobe controller turning on the backlight after a lighting start time, the lighting start time being a delay period after the exposure start time, the delay period being less than an exposure time of the imaging device.

14. The bubble measurement system of claim 1, wherein the vessel is cylindrical.

15. The bubble measurement system of claim 1, wherein the vessel includes a first plate and a second plate parallel to the first plate, the flow path being formed between the first and second plates, the flow path having a rectangular cross-section.

16. A bubble measurement system comprising:
   a bubble generator having an air bubble injector coupled to a fluid supply, the bubble generator controlling fluid pressure of the fluid supply, the bubble generator controlling fluid flow rate of the fluid supply, the bubble generator controlling air bubble size, the bubble generator controlling air bubble release rate;
   a bubble detector including a vessel having a flow path receiving the fluid from the fluid supply including the air bubbles from the bubble generator; and
   an imaging system having an imaging device for imaging the fluid and the air bubbles in the flow path of the vessel of the bubble detector, the imaging system having an imaging controller coupled to the imaging device and receiving images from the imaging device, the imaging controller processing the images to measure bubble size of each air bubble passing through the bubble detector, the imaging controller generating a control signal, the control signal used to control operation of the bubble generator based on the bubble size measured by the imaging system, wherein the imaging controller calibrates the bubble generator based on actual measured bubble characteristics of each individual air bubble.

17. The bubble measurement system of claim 16, wherein the air bubble injector includes a nozzle having an opening, the control signal causing the bubble generator to adjust the nozzle and change a size of the opening to adjust the air bubble size.

18. The bubble measurement system of claim 16, wherein the air bubble injector includes a valve, the control signal controlling opening and closing of the valve to adjust an amount of air released by the air bubble injector to adjust the air bubble size.

19. A method of controlling a bubble generator used to introduce air bubbles into a fluid flow, the method comprising:
   passing the fluid including the air bubbles through a vessel of a bubble detector;
   imaging the fluid and the air bubbles passing through the bubble detector using an imaging device;
   processing the images of the air bubbles to determine bubble sizes of the air bubbles;
   calibrating the bubble generator based on actual measured bubble characteristics of each individual air bubble; and
   controlling the bubble generator based on the bubble sizes determined based on the images of the air bubbles.

20. The method of claim 19, further comprising providing a feedback loop for the bubble generator to change the size of the air bubbles.

21. The method of claim 19, wherein the bubble generator includes an air bubble injector injecting controlled air bubbles from a nozzle into the fluid supply, said controlling the bubble generator includes adjusting a size of an opening of the nozzle to adjust the air bubble size.

22. The method of claim 19, wherein the bubble generator includes an air bubble injector injecting controlled air bubbles into the fluid supply, said controlling the bubble generator includes opening and closing a valve of the air bubble injector to adjust an amount of air released by the air bubble injector to adjust the air bubble size.

23. The method of claim 19, further comprising operating a backlight in a strobe effect using a strobe controller to light the fluid and the air bubble passing through the vessel.

\* \* \* \* \*